US010095344B2

(12) United States Patent
Miller et al.

(10) Patent No.: US 10,095,344 B2
(45) Date of Patent: Oct. 9, 2018

(54) TOUCH-SCREEN ASSEMBLY WITH RIGID INTERFACE BETWEEN COVER SHEET AND FRAME

(71) Applicant: Corning Incorporated, Corning, NY (US)

(72) Inventors: William James Miller, Horseheads, NY (US); Lucas Wayne Yeary, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/808,832

(22) Filed: Nov. 9, 2017

(65) Prior Publication Data

US 2018/0067603 A1 Mar. 8, 2018

Related U.S. Application Data

(63) Continuation of application No. 14/713,098, filed on May 15, 2015, now Pat. No. 9,851,827.

(60) Provisional application No. 62/003,676, filed on May 28, 2014.

(51) Int. Cl.

| | |
|---|---|
| ***G06F 3/041*** | (2006.01) |
| ***G06F 3/042*** | (2006.01) |
| ***G06F 3/044*** | (2006.01) |
| ***G06F 3/045*** | (2006.01) |

(52) U.S. Cl.

CPC ............ *G06F 3/0414* (2013.01); *G06F 3/042* (2013.01); *G06F 3/044* (2013.01); *G06F 3/045* (2013.01); *G06F 3/0416* (2013.01); *G06F 2203/04103* (2013.01); *G06F 2203/04104* (2013.01); *Y10T 156/10* (2015.01)

(58) Field of Classification Search

CPC ... G06F 3/0414; G06F 3/0416; G06F 3/04103

USPC .................................... 345/173–175; 349/60

See application file for complete search history.

(56) References Cited

U.S. PATENT DOCUMENTS

| | | | |
|---|---|---|---|
| 3,662,105 | A | 5/1972 | Hurst et al. |
| 3,798,370 | A | 3/1974 | Hurst et al. |
| 7,764,274 | B2 | 7/2010 | Westerman et al. |
| 8,294,688 | B2 | 10/2012 | Sarasmo |

(Continued)

FOREIGN PATENT DOCUMENTS

| | | |
|---|---|---|
| CN | 103184029 A | 7/2013 |
| CN | 103305135 A | 9/2013 |

(Continued)

OTHER PUBLICATIONS

PCT/US2015/032391 Invitation to Pay Additional Fees Dated Sep. 7, 2015.

PCT/US2015/032391 Search Report dated Dec. 9, 2015.

*Primary Examiner* — Calvin C Ma

(57) ABSTRACT

A touch-screen assembly for performing pressure sensing or force sensing is disclosed. The touch-screen assembly includes a cover sheet having touch-sensing capability and a frame having an upper surface portion. Spaced-apart adhesive islands are disposed between the cover sheet and the upper surface portion of the frame. The adhesive islands serve to secure the cover sheet to the frame and have a Young's modulus of greater than 1 MPa so that the energy associated with the touching force is not absorbed by the adhesive island. This makes for more accurate pressure-based or force-based touch sensing.

12 Claims, 6 Drawing Sheets

10 120 20 102 100 TL TE 150 26 74 70 Z 72 40 X S $F_T$

(56) References Cited

U.S. PATENT DOCUMENTS

| | | | |
|---|---|---|---|
| 8,610,691 | B2 | 12/2013 | Cherif |
| 8,755,001 | B2 | 6/2014 | Harada et al. |
| 2005/0160653 | A1 | 7/2005 | Regelin |
| 2010/0053115 | A1 | 3/2010 | Kim et al. |
| 2010/0231422 | A1 | 9/2010 | Inaba et al. |
| 2011/0050597 | A1 | 3/2011 | Park et al. |
| 2011/0057899 | A1 | 3/2011 | Sleeman et al. |
| 2011/0063257 | A1* | 3/2011 | Nojiri ..................... G06F 3/041 345/175 |
| 2011/0163975 | A1 | 3/2011 | Sleeman et al. |
| 2011/0081520 | A1* | 4/2011 | Nojiri ................... G02F 1/1303 428/141 |
| 2012/0056826 | A1 | 3/2012 | Kim et al. |
| 2013/0135258 | A1 | 5/2013 | King et al. |
| 2013/0135259 | A1 | 5/2013 | King et al. |
| 2013/0271697 | A1* | 10/2013 | DeForest .......... G02F 1/133305 349/60 |
| 2013/0331150 | A1 | 12/2013 | Butsusaka et al. |
| 2014/0098065 | A1 | 4/2014 | Deichmann et al. |

FOREIGN PATENT DOCUMENTS

| | | | |
|---|---|---|---|
| WO | 2009157614 | A1 | 12/2009 |
| WO | 2012117738 | A1 | 9/2012 |
| WO | 2013046583 | A1 | 4/2013 |
| WO | 2013192311 | A1 | 12/2013 |

* cited by examiner

TOUCH-SCREEN ASSEMBLY WITH RIGID INTERFACE BETWEEN COVER SHEET AND FRAME

This application is a Continuation of U.S. patent application Ser. No. 14/713,098, filed on May 15, 2015, which in turn, claims the benefit of priority to U.S. Provisional Application Ser. No. 62/003,676, filed on May 28, 2014, the content of each are relied upon and incorporated herein by reference in their entirety.

FIELD

The present disclosure relates to touch screens, and in particular to a touch-screen assembly that has a rigid interface between the cover sheet and the frame.

The entire disclosure of any publication or patent document mentioned herein is incorporated by reference.

BACKGROUND

The market for displays and other devices (e.g., keyboards) having touch functionality is rapidly growing. As a result, touch-sensing techniques using touch screens have been developed to enable displays and other devices to have touch functionality. Touch-sensing functionality is gaining wider use in mobile device applications, such as smart phones, e-book readers, laptop computers and tablet computers.

Touch-screen devices have been developed that rely on the amount of touching force or pressure (force/area) applied to one or more touch locations on the cover sheet. An accurate determination of the touching forces associated with one or more touches is needed for the touch-screen device to respond properly.

The conventional fabrication of a touch-screen device includes securing the cover sheet to a support frame. This is typically accomplished with an adhesive material, such as pressure-sensitive tape, which has substantial pliability or compliance (i.e., a relatively low Young's modulus). Thus, when a touching force is applied, the adhesive material is compressed, and when the touching force is terminated, the adhesive material relatively slowly expands back to its original size.

For most touch-screen devices, the degree of compliance of the adhesive material does not substantially impact the operation of the device. On the other hand, for those touch-screen devices that rely on the force or pressure measurement associated with a touch event, the compression and expansion of the adhesive material can cause an improper measurement. In particular, some portion of the touching force can go into compressing the adhesive material rather than into deforming or displacing the cover sheet, thereby leading to an erroneous force or pressure measurement.

SUMMARY

An aspect of the disclosure is a touch-screen assembly for performing pressure sensing or force sensing. The touch-screen assembly includes: a cover sheet having an upper surface and a bottom surface, the cover sheet having touch-sensing capability; a frame having an upper surface portion; and a plurality of islands disposed between the cover sheet and the upper surface portion of the frame, the islands being adhesive and serving to secure the cover sheet to the frame, wherein the islands have a Young's modulus of greater than 1 MPa. The islands thus serve as a rigid interface between the cover sheet and the frame.

Another aspect of the disclosure is a touch-screen assembly for performing pressure sensing or force sensing due to at least one touching force. The touch-screen assembly includes: a cover sheet having an upper surface and a bottom surface, the cover sheet having touch-sensing capability; a frame having an upper surface portion and a base; a plurality of spaced-apart islands disposed on the upper surface portion of the frame, the islands having a height H and a Young's modulus of greater than 1 MPa; and a compressible adhesive material disposed between the cover sheet and the upper surface portion of the frame and between the islands, the compressible adhesive material serving to adhere the cover sheet to the frame and having an uncompressed height h≥H so that the islands limit compression of the compressible adhesive material to a distance of h−H when the cover sheet is subjected to the at least one touching force.

Another aspect of the disclosure is a method of forming a touch-screen assembly for performing pressure sensing or force sensing due to at least one touching force. The method includes: disposing on a surface portion of a frame a plurality of islands having a height H and a Young's modulus of greater than 1 MPa; disposing a compressible adhesive material on the surface portion of the frame between the islands, the compressible material having an uncompressed height h≥H; and adhering a cover sheet to the frame using the compressible adhesive material, and wherein the islands limit compression of the compressible adhesive layer to a distance h−H when the at least one touching force is applied to the cover sheet.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this Detailed Description.

Cartesian coordinates are shown in some of the Figures for the sake of reference and are not intended to be limiting as to direction or orientation.

The term "rigid" when used to describe the islands discussed herein is shorthand for the resistance-to-flow of the material making up the islands when subject to pressure (i.e., being squeezed between the cover sheet and the frame) due to at least one touching force applied to the cover sheet, wherein a sufficiently rigid material has a Young's modulus of greater than 1 MPa.

Figure 1:
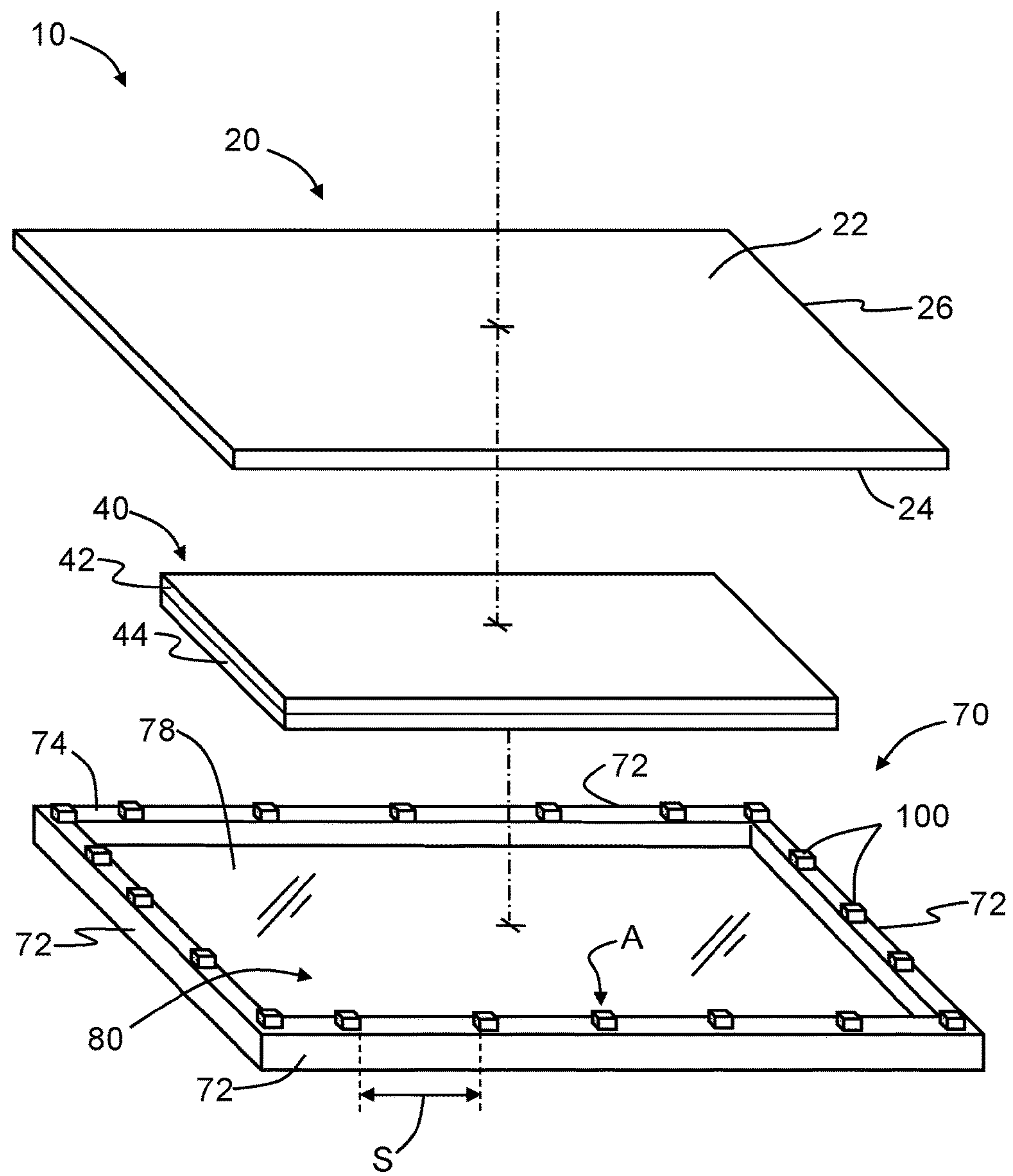
FIG. 1 is an exploded view of an example touch-screen system as disclosed herein.

FIG. 1 is an exploded diagram of the main components of a touch-screen system 10. The touch-screen system 10 includes a transparent cover sheet 20, such as a rectangular sheet as shown. The cover sheet 20 includes a top surface 22, a bottom surface 24 and a perimeter or sides 26. In an example, cover sheet 20 is configured to have at least one of capacitive touch sensing, resistive touch sensing and optical touch sensing. Example touch screens that employ capacitive touch sensing are disclosed in U.S. Pat. Nos. 3,662,105; 3,798,370; and 7,764,274. Example touch screens that employ resistive touch sensing are disclosed in U.S. Pat. Nos. 8,610,691 and 8,294,688. Examples of touch screens that employ optical touch sensing are disclosed in U.S. Pub. Nos. 2013/0135258 and 2013/0135259.

Example materials for cover sheet 20 include any one of various types of glass, including chemically strengthened glass such as Gorilla Glass®, available from Corning, Inc., Corning, N.Y. The cover sheet 20 can also comprise an acrylic, transparent polymer, etc., and can include one or more protective coatings.

The touch-screen system 10 also includes a display device 40 that includes a display 42 and support electronics 44. The display device 40 is configured to generate a display image (not shown) on display 42.

The touch-screen system 10 further includes a support frame ("frame") 70. The frame 70 includes walls 72 having an upper surface 74. The upper surface 74 thus defines an upper surface portion of frame 70 and so is also referred to as "surface portion" 74. The frame 70 also includes a floor or base 78. The walls 72 and base 78 define an open frame interior 80 sized to accommodate display device 40 and any other support devices, such as wires, connectors, cabling, power supplies, circuit boards, circuitry, etc. (not shown) that are not otherwise included in support electronics 44. The frame 70 is shown as being rectangular by way of example. The frame 70 can have other shapes, as well as curved walls 72 or a single curved wall that also forms base 78.

The frame 70 is shown as supporting spaced-apart islands 100 on upper surface 74 of walls 72. In an example, islands 100 are made of an adhesive material and are used to form a relatively rigid interface between cover sheet 20 and frame 70, in which case they are referred to as "adhesive islands" 100. The islands 100 have a Young's modulus of values much greater than 1 MPa so that they are sufficiently rigid, i.e., they do not flow substantially or compress substantially when subjected to pressure or when pressure is relieved, as discussed below. An example material for islands 100 is an epoxy such as a two-part epoxy. An example of a suitable two-part epoxy is MS-907 from Miller-Stephenson Chemical Co., Inc., of Danbury, Conn. In an example, islands 100 are made of a UV-curable epoxy resin.

In an example, each island 100 can have a surface mounting area A of between 0.5 $mm^2$ and 60 $mm^2$. Adjacent islands 100 have a spacing S, which in one example is greater than 1 mm, in another example is greater than 5 mm and in yet another example is greater than 10 mm. The shape of islands 100 can vary and are shown as small squares for ease of illustration. The islands 100 can be round, elongate, oval, etc. and can be any reasonable shape that provides sufficient contact area on bottom surface 24 of cover sheet 20 and upper surface 74 of walls 72 of frame 70. In an example, upper surface 74 of frame 70 can be provided with indentations (not shown) that serve to at least partially contain islands 100. The use of such indentations can also serve to limit any spreading or displacement of the material making up islands 100 when a touching force $F_T$ is applied to cover sheet 20.

Touch-Screen Assembly with Adhesive Islands

Figure 2:
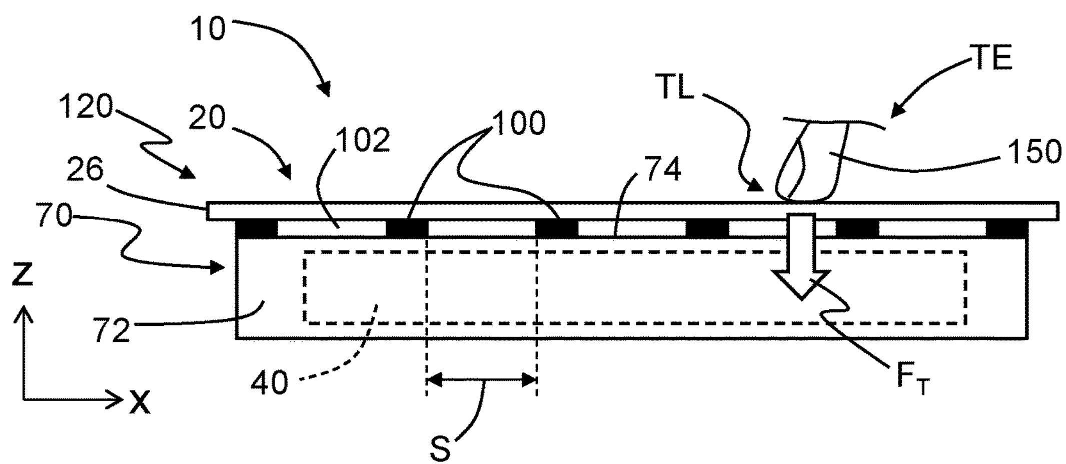
FIG. 2 is a side view of the example touch-screen system of FIG. 1, wherein the cover sheet and the frame constitute a touch-screen assembly.

FIG. 2 is a side view of an example assembled touch-screen system 10 wherein islands 100 are adhesive islands. The display device 40 is shown operably arranged in frame 70 within interior 80. The cover sheet 20 is interfaced with upper surface 74 of frame 70 and is fixed thereto via adhesive islands 100, which are shown in black in FIG. 2 for clarity. The spacing S between adhesive islands 100 need not be uniform and can vary as a function of the position of the adhesive islands on upper surface 74. The cover sheet 20, frame 70 and adhesive islands 100 that fixedly interface these two components constitute a touch-screen assembly 120. FIG. 2 shows an example touching implement 150 (e.g., a finger, a stylus, a pencil, etc.) that defines a touch event TE at a touch location TL and the associated touching force $F_T$. The cover sheet bottom surface 24, frame upper surface 74 and adhesive islands 100 define spaces or gaps 102. The adhesive islands 100 define a rigid interface between cover sheet 20 and frame 70.

By the utilization of adhesive islands 100, cover sheet 20, when subjected to one or more touching forces $F_T$, can be displaced and otherwise allowed to flex to a degree sufficient to provide touch-sensing capability that can measure displacement, force or pressure due to touch event TE at touch location TL (or multiple touch events TE and multiple touch locations TL). If there are too many adhesive islands 100 and/or insufficient space S therebetween, cover sheet 20 may distort (e.g., via so-called potato-chip distortion) when subjected to one or more touching forces $F_T$, and can even crack, break or shatter.

In an example, a substantial portion of cover sheet 20 at the location where it is affixed to frame 70 is free to bend and otherwise move in the Z-direction. Note also that cover sheet 20 need not be fixed to frame 70 immediately at the cover sheet perimeter 26, and the attachment locations can be inboard of the perimeter. The use of islands 100 serves to define a rigid interface between cover sheet 20 and frame 70.

Figure 3:
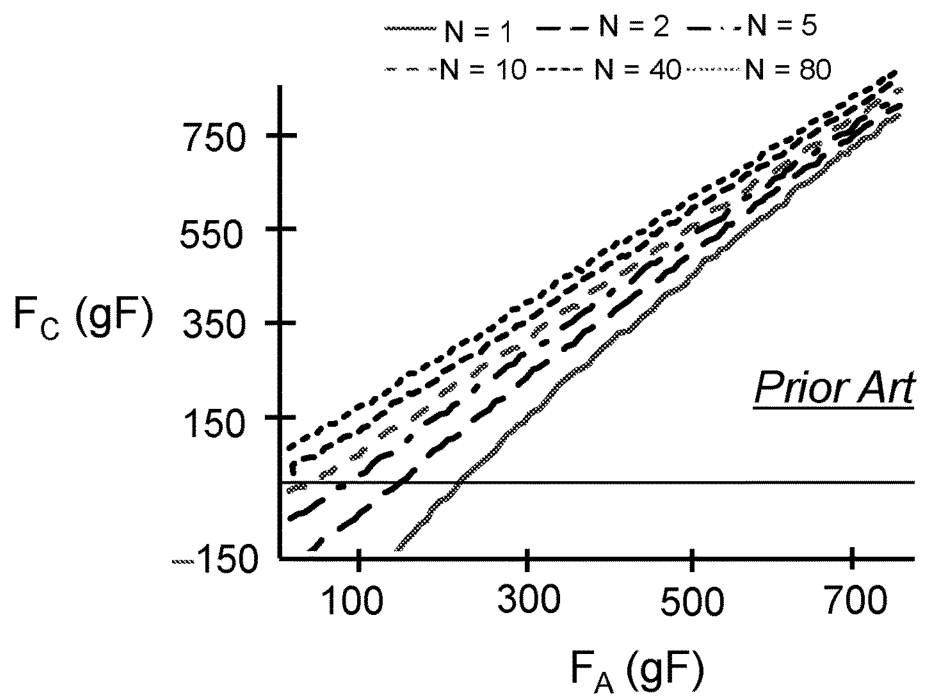
FIG. 3 is a plot of an applied force $F_A$ (gram-force, gF) versus the resulting calculated force $F_C$ (gF) for an example prior-art touch-screen assembly wherein a compressible adhesive material in the form of a conventional pressure-sensitive adhesive (PSA) was used to fix the cover sheet to the frame, the data of FIG. 3 being obtained by the performance of an experiment on the prior-art touch-screen assembly wherein the applied force $F_A$ was applied in the same location and repeated about N=80 times over a fifteen-minute period.

FIG. 3 is a plot of an applied force $F_A$ (gram-force, gF) versus the calculated force $F_C$ (gF) for an example prior-art touch-screen assembly wherein a compressible adhesive material in the form of a pressure-sensitive adhesive (PSA) was used to fix cover sheet 20 to frame 70. The data of FIG. 3 were obtained by the performance of an experiment on the prior-art touch-screen assembly wherein an applied force $F_A$ was applied in the same location and repeated about N=80 times over a fifteen-minute period. The number N is thus the number of touch event TE.

The applied force $F_A$ for the repetitive touch events TE was changed from 0 to 850 gF and the response measured. The measured response took the form of a measured displacement of cover sheet 20 using an optical proximity sensor. The measured displacement was then converted into a calculated resulting force $F_C$ using a lookup table assembled earlier based on empirical data.

The plot of FIG. 3 shows six different curves corresponding to the touch event numbers N=1, N=2, N=5, N=10, N=40 and N=80 for the given applied force $F_A$. FIG. 3 clearly shows that the force readings change, depending on the number of presses or touches. This is due to the relaxation of the prior-art PSA and the variation in the amount of compression and relaxation of the PSA that occurs over time.

Figure 4:
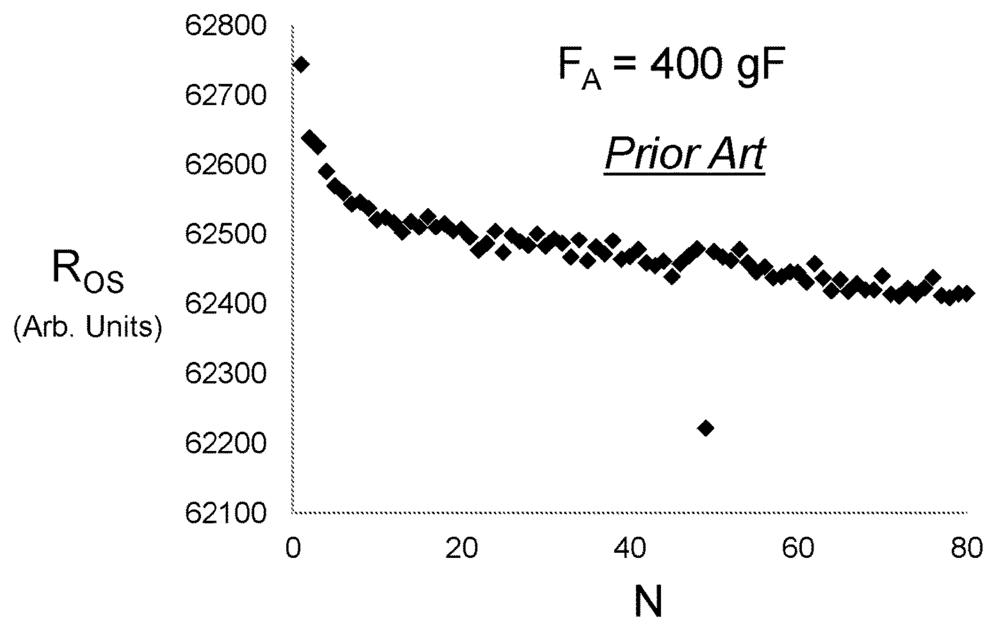
FIG. 4 is a plot of the optical sensor response $R_{OS}$ (arbitrary units) versus the number N of touch events conducted at an applied force $F_A$=400 gF and is based on the data associated with FIG. 3, illustrating a variation in the optical sensor response with the number of touch events N.

FIG. 4 is a plot of the optical sensor response $R_{OS}$ (arbitrary units) versus press number P# for an applied force $F_A$=400 gF. The data of FIG. 4 shows how the optical sensor response changes with the touch event number N due to the variation in the compression and of the PSA over time.

Figure 5:
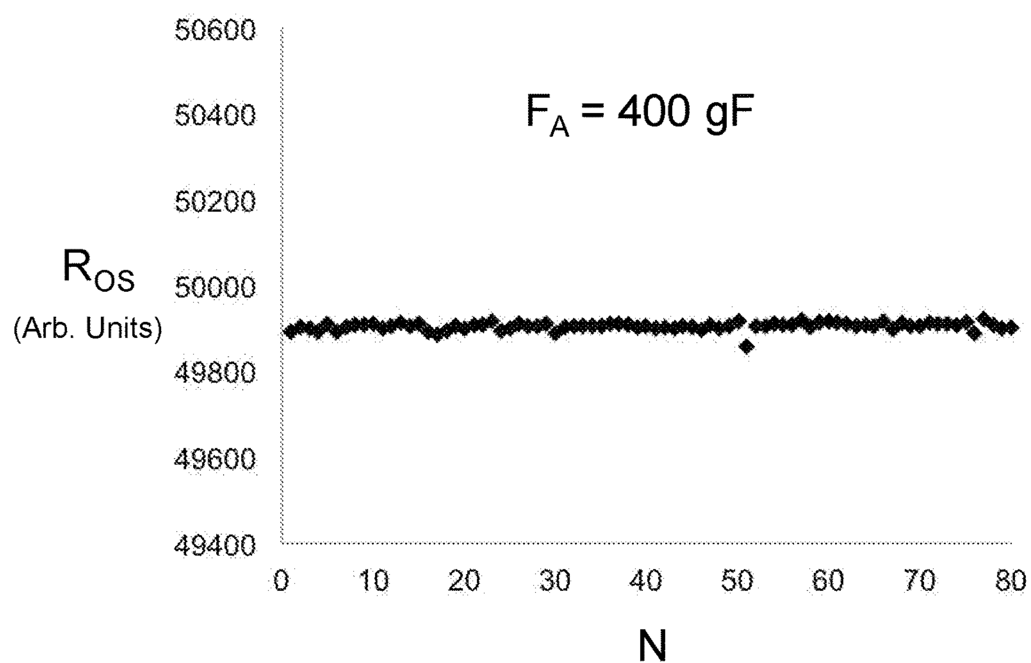
FIG. 5 is the same plot as FIG. 4 but for the touch-screen assembly as disclosed herein that employs rigid adhesive, which substantially reduces the amount of relaxation that occurs after a touch event, as indicated by the substantially constant optical detector response as a function of the number N of touch events.

FIG. 5 is the same plot as FIG. 4 but for a modified version of the touch-screen assembly 120 as disclosed herein that employs a perimeter of rigid adhesive. The perimeter of rigid adhesive did not compress or relax over time when subjected to pressure (e.g., the compressive force formed by touching force $F_T$). This resulted in consistent displacement readings from the optical sensor, which translated into a consistent displacement of cover sheet 20.

Figure 6A:
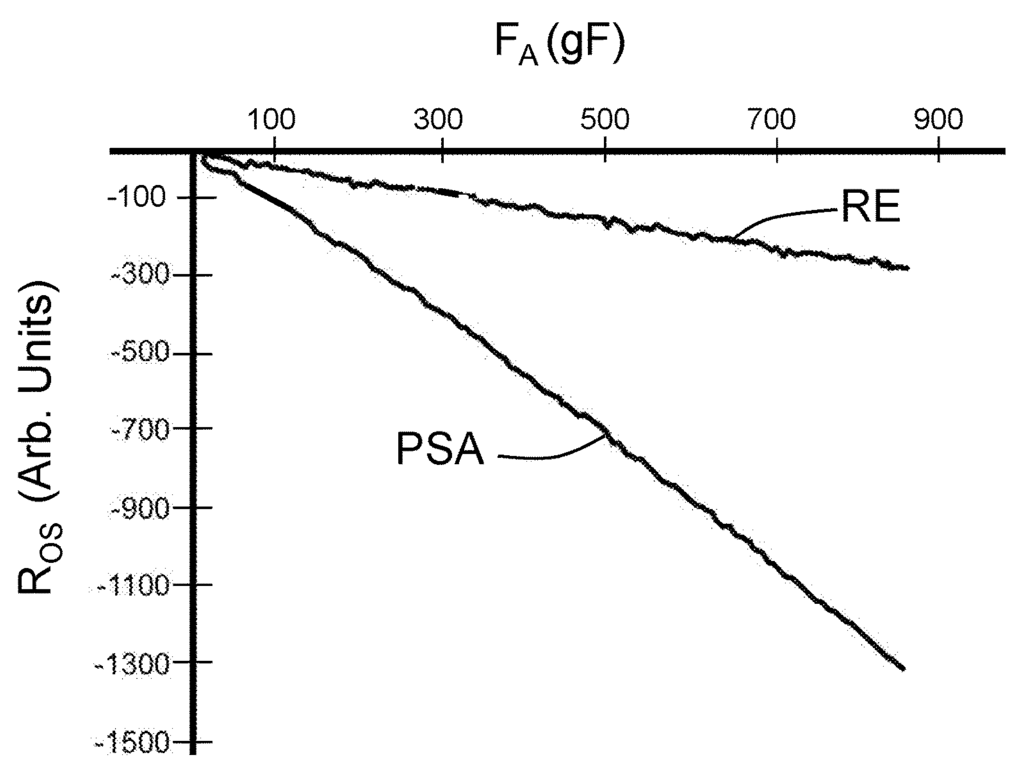
FIG. 6A is a plot of the optical sensor response $R_{OS}$ (arbitrary units) versus the applied force $F_A$ (gF) for touch-event number N=40, the plot comparing the optical sensor response for a prior-art touch-screen assembly that uses PSA (curve PSA) and the touch-screen assembly disclosed herein that uses a perimeter of rigid epoxy (curve RE)

FIG. 6A is a plot of the optical sensor response $R_{OS}$ (arbitrary units) versus the applied force $F_A$ (gF) for touch-event number 40, wherein the plot compares the optical sensor response for a prior-art touch-screen assembly that uses PSA (curve PSA) to that of a touch-screen assembly that uses a perimeter of rigid epoxy (curve RE). The measurements for the prior-art configuration for the touch-screen assembly are shown as the solid line, while the measurements for the touch-screen assembly using a perimeter of rigid epoxy are shown as the dashed line labeled RE.

The data of FIG. 6A show an overall reduced optical sensor response $R_{OS}$ for the perimeter of epoxy versus the PSA. However, using adhesive islands 100 rather than a continuous perimeter and adjusting the spacing S and the surface mounting area A of the adhesive islands allows for tailoring the amount of displacement and freedom of movement of cover sheet 20 and thus the magnitude of the optical sensor response for a given touching force $F_T$.

Figure 6B:
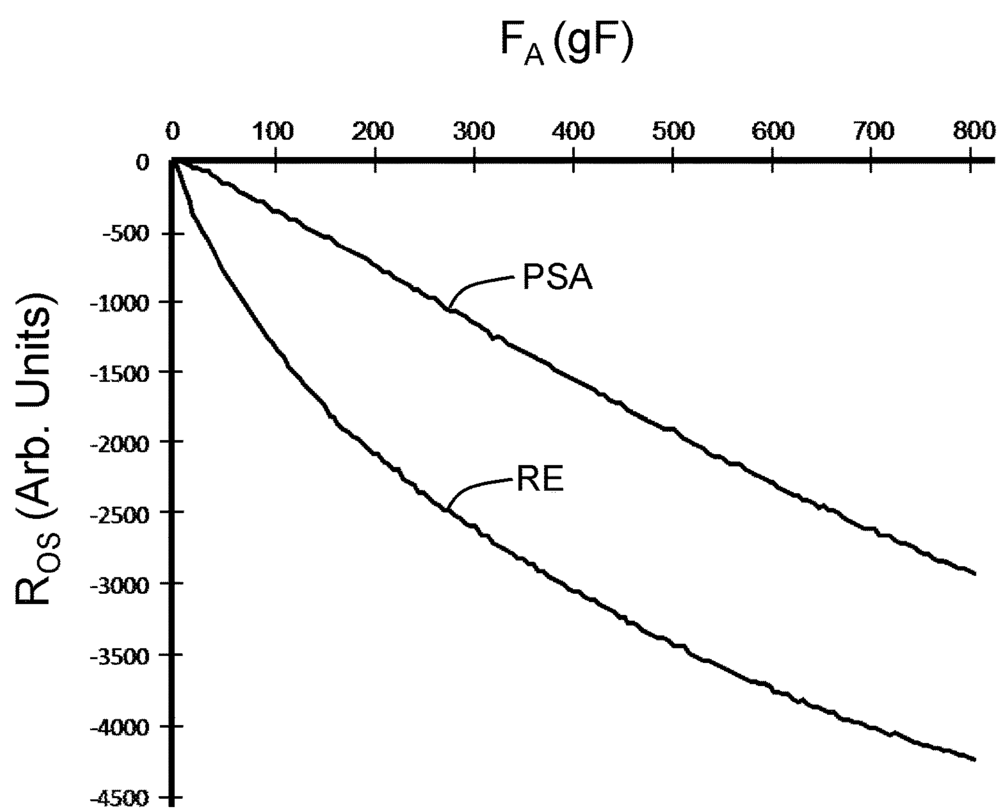
FIG. 6B is a plot of the optical sensor response $R_{OS}$ (arbitrary units) versus the applied force $F_A$ (gF) comparing the optical sensor response of a different prior-art touch-screen assembly that uses PSA (curve PSA) to that of the touch-screen assembly disclosed herein that uses a rigid epoxy for adhesive islands (curve RE)

FIG. 6B is a plot of the optical sensor response $R_{OS}$ (arbitrary units) versus the applied force $F_A$ (gF) comparing the optical sensor response for a prior-art touch-screen assembly that uses PSA (curve PSA) to that of a touch-screen assembly that uses a rigid epoxy for adhesive islands (curve RE). The measurements for the prior-art configuration for touch-screen assembly 120 are shown in the curve labeled PSA, while the measurements for the touch-screen assembly that employs adhesive islands 100 of rigid epoxy are shown as the curve labeled RE. The data of FIG. 6B show an overall increase in the optical sensor response $R_{OS}$ for adhesive islands 100 of rigid epoxy versus the PSA. Measurements of the touch sensitivity of touch-screen assembly 120 show similar overall sensitivity to prior-art configurations of the touch-screen assembly, but without the attendant errors in the measurement of the amount of touching force $F_T$.

Touch-Screen Assembly where Islands Serve as Stopping Members

Figure 7A:
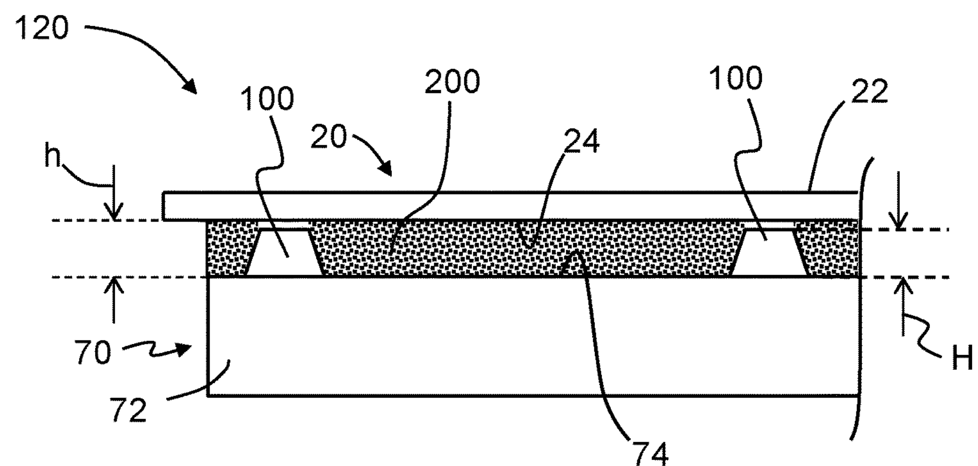
FIGS. 7A and 7B are close-up side views of an example touch-screen assembly that includes rigid stopping members with a compressible adhesive material therebetween, wherein the rigid stopping members serve to limit the amount to which the compressible adhesive material can compress when the cover sheet is subjected to at least one touching force.

FIG. 7A is a close-up side view of a portion of touch-screen assembly 120 illustrating an example embodiment wherein a relatively flexible (i.e., non-rigid) adhesive material 200, such as conventional PSA, resides in spaces or gaps 102 between spaced-apart islands 100. In an example, islands 100 have a height H that is equal to or less than the initial (uncompressed) height h of adhesive material 200.

Figure 7B:
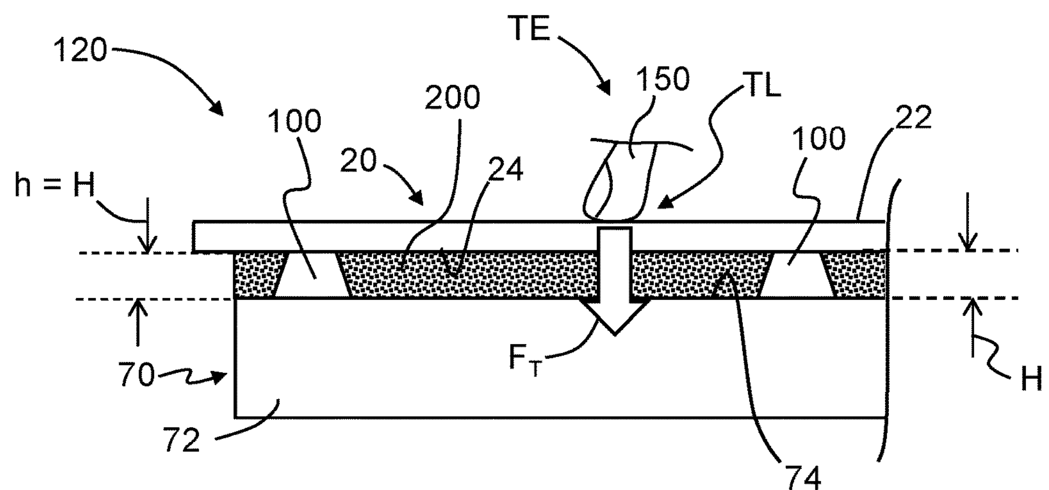

In the configuration where $H<h$, islands 100 are not adhered to cover sheet 20 at bottom surface 24 and so do not serve to bond the cover sheet to frame 70. Instead, there is a small gap of size h−H, with islands 100 serving as rigid stopping members that act as a hard stop to the compression of adhesive material 200 when cover sheet 20 is subjected to a touching force $F_T$, such as is shown in FIG. 7B. In FIG. 7B, adhesive material 200 is slightly compressed due to touching force $F_T$ from implement 150 until h=H. At that point, islands 100 contact bottom surface 24 of cover sheet 20 and serve as stand-offs, thereby preventing further displacement of the cover sheet and preventing further compression of adhesive material 200. The islands 100 define a rigid interface between cover sheet 20 and frame 70 when h=H.

In this manner, conventional compliant adhesive material 200 can be used to interface cover sheet 20 with frame 70 without the adverse compression and relaxation effects that lead to erroneous measurements of the displacement of the cover sheet and/or the touching force $F_T$. Further, since islands 100 are not performing an adhesive function in this embodiment, they can be more spaced apart than usual, thereby providing greater latitude for cover sheet 20 to be displaced and otherwise flexed when one or more touching forces $F_T$ are applied.

In an example, islands 100 are made of any material having a Young's modulus of greater than 1 MPa and that can be fixed to upper surface portion 74 of frame 70. In various example applications, it may be easiest to form islands 100 from an adhesive material, such as an epoxy. The use of rigid islands 100 in the present embodiment serves to define a rigid interface between cover sheet 20 and frame 70 while still allowing for the use of non-rigid adhesive material to secure the cover sheet to the frame.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A touch-screen assembly for performing pressure sensing or force sensing, comprising:

a cover sheet having an upper surface and a bottom surface, the cover sheet having touch-sensing capability;

a frame having an upper surface portion; and a plurality of islands disposed between the cover sheet and the upper surface portion of the frame, the islands being made entirely of a single adhesive material and serving to secure the cover sheet to the frame, wherein the islands have a Young's modulus of greater than 1 MPa.

2. The touch-screen assembly according to claim 1, wherein the cover sheet operably supports at least one of capacitive touch-sensing, resistive touch-sensing and optical touch-sensing.

3. The touch-screen assembly according to claim 1, wherein the adhesive islands are equally spaced apart.

4. The touch-screen assembly according to claim 1, wherein the islands are formed from an epoxy.

5. The touch-screen assembly according to claim 4, wherein the islands are formed from a UV-curable epoxy resin.

6. The touch-screen assembly according to claim 1, wherein the islands have a surface mounting area of between 0.5 $mm^2$ and 60 $mm^2$.

7. The touch-screen assembly according to claim 6, wherein adjacent islands define a spacing that is greater than 1 mm.

8. The touch-screen assembly according to claim 6, wherein the frame includes a plurality of walls that each has an upper surface, and where the upper surfaces define the upper surface portion of the frame.

9. The touch-screen assembly according to claim 1, wherein the cover sheet comprises a chemically strengthened glass.

10. A method of forming a touch-screen assembly for performing pressure sensing or force sensing due to at least one touching force, comprising:

disposing on a surface portion of a frame a plurality of spaced-apart adhesive islands each made entirely of a single adhesive material;

adhering a cover sheet to the frame using the spaced-apart adhesive islands; and allowing the spaced-part adhesive islands to become rigid to have a Young's modulus of greater than 1 MPa.

11. The method according to claim 10, wherein each of the space-apart adhesive islands is made of an epoxy.

12. The method according to claim 11, wherein the cover sheet comprises a chemically strengthened glass.

* * * * *